(No Model.)
T L. COURTNEY.
MUZZLE YOKE.
No. 556,306. Patented Mar. 10, 1896.
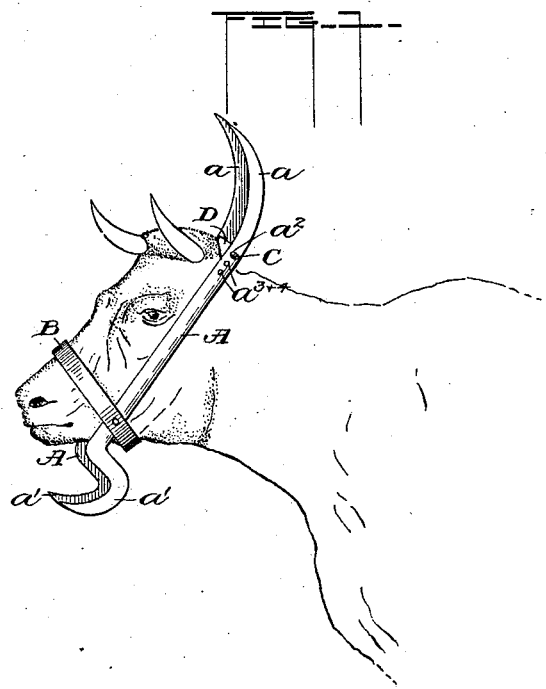
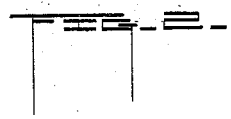
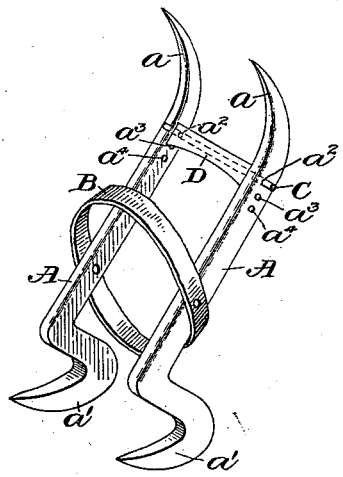
Witnesses
O. W. Smith
M. A. Dillon
Inventor
Thomas L. Courtney,
by Charles L. Sturtevant
his Attorney

UNITED STATES PATENT OFFICE.

THOMAS LAFAYETTE COURTNEY, OF PETTEWAY, TEXAS.

MUZZLE-YOKE.

SPECIFICATION forming part of Letters Patent No. 556,306, dated March 10, 1896.

Application filed November 19, 1894. Serial No. 529,343. (No model.)

*To all whom it may concern:*

Be it known that I, THOMAS LAFAYETTE COURTNEY, a citizen of the United States, residing at Petteway, in the county of Robertson, State of Texas, have invented a Yoke to Restrain Breachy Cattle, of which the following is a specification.

My invention relates to animal-yokes used to prevent cattle from jumping or breaking through fences, my object being to provide such a construction that any attempt of the animal to jump or break through a fence will cause the yoke to bind upon him, thus effectually stopping the animal from any further effort; and to this end the invention consists in the matter hereinafter described and claimed.

In the accompanying drawings, which illustrate the invention, Figure 1 shows the present yoke in position upon an animal, and Fig. 2 is a perspective of the yoke detached.

Referring now more particularly to the drawings, A A represent the side pieces of the yoke, which side pieces have their upper ends formed into hooks $a$ $a$ and their lower ends formed into hooks $a'$ $a'$.

A nose-band B of suitable shape is attached in any convenient manner, as by rivets, to the side pieces, preferably a little above the lower hooks, said side pieces being thus connected. The nose-band, of course, holds the lower part of the yoke in proper position, and in order to secure the yoke upon the animal a connection is provided for the upper portion. This connection comprises a screw-rod C extending through suitable openings, as $a^2$, in the side pieces, the rod passing through a bore in a block D of any suitable length, the block being curved on its lower side to conform to the curvature of the animal's head. In order to permit adjustment of the length of the yoke, additional openings, as $a^3$ $a^4$, are provided in the side pieces.

As will be seen from the drawings, the yoke is placed upon the animal with the band B about the nose and the block D just behind the horns, the hooks projecting toward the front. Thus should an attempt be made to push under a wire, the upper hooks engage the same, forcing the block downwardly against the head and forcing the band upwardly against the lower jaw, while should the animal attempt to jump the fence the lower hooks will catch the wire, forcing the band downwardly upon the nose. The binding action thus produced, of course, deters the animal from any further exertions. The present yoke thus effectually prevents an animal's escape over or through a fence, and as the parts are all rigidly and compactly assembled there is no interference with freedom in grazing or drinking and no danger of injury to the animal from being caught by any of the hooks.

Having thus described my invention, what I claim as new, and desire to secure by Letters Patent, is—

An animal-yoke comprising side pieces each formed of a single piece of material with its upper and lower ends formed into hooks, said side pieces being provided with openings as $a^2$ below the upper hook, a nose-band encircling the nose and lower jaw attached to said side pieces below the openings, a block between said side pieces and adapted to rest back of the horns, said block having a bore, and a removable rod passing through the openings in the side pieces and the bore in the block; substantially as described.

THOMAS LAFAYETTE COURTNEY.

Witnesses:
JUDGE ROGERS,
HENRY DALLAM.